United States Patent [19]

Gauggel

[11] Patent Number: 5,013,986
[45] Date of Patent: May 7, 1991

[54] ACTUATING DRIVE FOR POSITIONING A ROTARY ELEMENT

[75] Inventor: Roland Gauggel, Waldstrabe, Fed. Rep. of Germany

[73] Assignee: Bodenseewerk Geratetechnik GmbH, Uberlingen/Bodensee, Fed. Rep. of Germany

[21] Appl. No.: 346,420

[22] Filed: May 2, 1989

[30] Foreign Application Priority Data

May 2, 1988 [DE]  Fed. Rep. of Germany ....... 3814810

[51] Int. Cl.⁵ .............................................. G05B 11/18
[52] U.S. Cl. ................................... 318/593; 318/594; 318/49
[58] Field of Search .................... 318/40–87, 318/590–594, 567, 568, 569

[56] References Cited

U.S. PATENT DOCUMENTS

| | | | |
|---|---|---|---|
| 2,798,992 | 7/1957 | Adler et al. | 318/593 |
| 2,922,991 | 1/1960 | Frank | 318/593 X |
| 3,995,206 | 11/1976 | Aronstein et al. | 318/593 |
| 4,297,624 | 10/1981 | Komiya | 318/594 |
| 4,300,078 | 11/1981 | Pascal | 318/49 |

*Primary Examiner*—William M. Shoop, Jr.
*Assistant Examiner*—Paul Ip
*Attorney, Agent, or Firm*—Lee, Mann, Smith, McWilliams & Sweeney

[57] ABSTRACT

A rotary element (10) such as a robot arm is to be positioned by an actuating drive to a position determined by a desired value signal. An angle pick-off (20) provides an actual value signal. A first controller (36) provides a first controller output signal through an adaptive transfer element with limitation. The first controller output signal is applied to a first torque motor (18) the rotor of which is directly connected with the rotary element (10). A second controller (38) provides a second controller output signal, which is applied to a second torque motor (22). The second torque motor (22) is connected with the rotary element (10) through a step down system (26) and a resilient coupling member (30). A coupling path (40) with an integrator applies a trimming signal dependent on the input of the first torque motor (18) to the input of the second torque motor (22). The second torque motor (22) through the step down system (26) provides a coarse positioning under load, while the first torque motor (18) provides a fine positioning independent of friction and play of the step down system.

15 Claims, 2 Drawing Sheets

ACTUATING DRIVE FOR POSITIONING A ROTARY ELEMENT

TECHNICALS FIELD

The invention relates to an actuating drive for positioning a rotary element to a position determined by a desired value signal.

Highly accurate actuating drives are required in aeronautical and space applications for precisely stabilizing or aligning navigational sensors, cameras or antenna systems. Another application is the exact positioning of robots.

BACKGROUND ART

With such actuating drives the element to be positioned is mounted on a one or more axis gimbal system. Each of the individual axes is provided with an actuating drive. The actuating drive comprises a torque motor and an angle pick-off. The torque motor is energized through an electronic control device. A desired value signal is supplied to the electronic control device. This desired value signal determines the position which the element is to adopt. The torque motor rotates the element to be positioned such that the angle pick-off provides a feedback signal corresponding to the desired position.

Often rather large torques have to be exerted for this positioning movement. These torques occur, for example, when a robot arm has to lift or even to hold a load. Torques have also to be overcome during the positioning movement due to moments of inertia of the moving parts.

Actuating drives exist wherein the rotary element, which is to be positioned, is connected directly with the rotor of the torque motor. This permits very accurate positioning. The positioning accuracy is determined substantially only by the quality of the angle pick-up.

In order to exert large torques, however, a large torque motor is required with such actuating drives, which is fed by a high power current. Such torquers increase the volume of the device. Due to the mass and the moment of inertia of the torque motor, a higher torque for positioning is required.

A further problem, which arises in particular during continuous operation, is the heating up of the system due to the current supplied to the torque motor. Such heating up or quick temperature changes counteract the requirement of high positioning accuracy.

Actuating drives are also known, wherein the torque motor is connected with the rotary element through a step down system. Thereby smaller torque motors can be used. In addition, operation with lower currents is possible. However the accuracy of the positioning is reduced due to friction and play in the step down system.

DISCLOSURE OF THE INVENTION

It is an object of the invention to provide an actuating drive which, with small size and low current consumption, is able to exert high torques and achieves high accuracy of the positioning.

According to the invention, this object is achieved by the combination of (a) an angle pick-off, which provides an actual value signal indicative of the position of the rotary element,
(b) a first controller, to which the difference of actual value signal and desired value signal is applied as error signal and which provides a first controller output signal,
(c) a first torque motor,
the rotor of which is directly connected with said rotary element, and
to which said first controller output signal from said first controller is applied,
(d) a second controller, to which the difference of said actual value signal and said desired value signal is applied as error signal and which provides a second controller output signal,
(e) a second torque motor, to which the second controller output signal from said second controller is applied,
(f) a step down system, the input member of which is connected to said torque motor and the output member of which is in driving connection with said rotary element, and
(g) means for linking the control loops of said first and second controllers such that said second torque motor through said step down system provides for coarse positioning of said rotary element to be positioned, and said first torque motor provides for fine positioning after such coarse positioning.

Thus according to the invention two torque motors are provided. One torque motor operates through a step down system with relatively large torque. Another torque motor is connected directly with the rotary element. Appropriate linking of the control loops of the controllers associated with the two torque motors ensures that the torque motor with the step down system provides a coarse positioning, while the torque motor connected directly with the rotary element takes care of fine positioning, and that the two torque motors do not interfere with each other during these operations.

Further modifications of the invention are claimed in the dependent claims.

An embodiment of the invention is described hereinbelow in greater detail with reference to the accompanying drawings.

PREFERRED EMBODIMENT OF THE INVENTION

Figure 1:
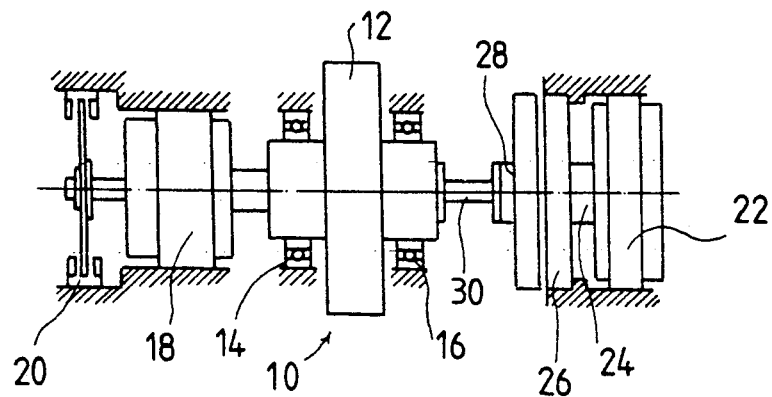
FIG. 1 schematically illustrates the mechanical construction of an actuating drive comprising a first torque motor connected directly with a rotary element, and a second torque motor, which is in driving connection with the rotary element through a step down system and a torsion spring.

Referring to FIG. 1, numeral 10 designates a rotary element. In FIG. 1, this rotary element is illustrated as a flywheel 12, which is mounted in bearings 14 and 16. The rotary element is, on one hand, directly connected with the rotor of a first torque motor 18. An angle pick-off 20 is connected with this rotor and thus with the rotary element. A second torque motor 22 is connected with the input member 24 of a step down system 26. The output member 28 of the step down system 26 is also connected with the rotary member to be positioned through a resilient coupling member 30.

Figure 2:
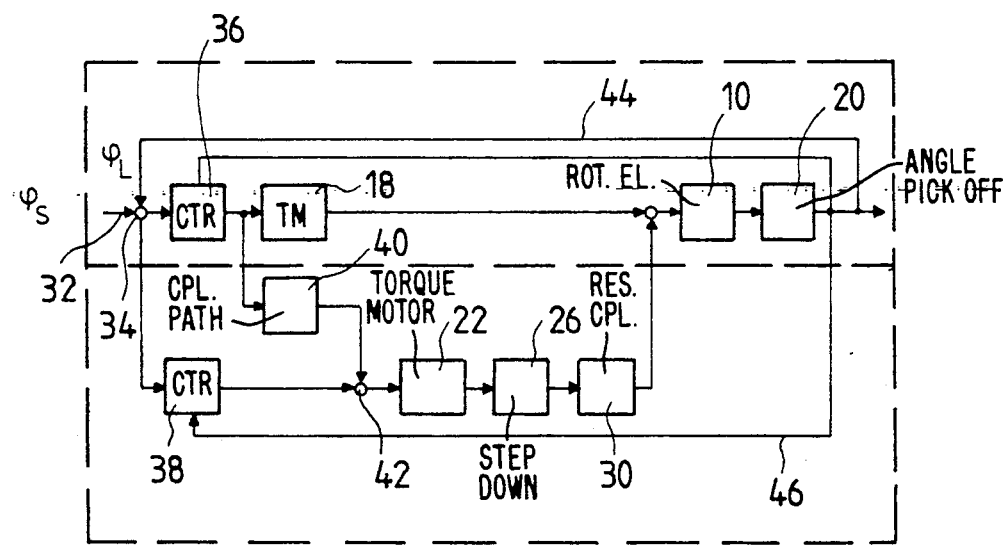
FIG. 2 is a block diagram and illustrates the principle of the actuating drive.

In FIG. 2, the principle of the actuating drive including the controllers is illustrated as block diagram. A desired value signal $\rho_S$ is applied to an input 32, this desired value signal representing a desired angular position. This desired value signal $\rho_S$ is opposed to an actual value signal $\rho_L$ at a controller input 34, which, in FIG. 2, is illustrated as a summing junction. The actual value signal $\rho_L$ is provided by the angle pick-up 20. The difference of the desired value signal and of the actual value signal is applied, as error signal, both to a first controller 36 and to a second controller 38. The first controller provides a first controller output signal, which is applied to the first torque motor 18. The first torque motor 18 is connected directly with the rotary element 10. The rotary element 10, in turn, is connected with the angle pick-up 20. The second controller 38 provides a second controller output signal. This second controller output signal is applied to the second torque motor 22. The second torque motor 22 is connected with the step down system 26. The step down system, in turn, is also connected with the rotary element through the resilient coupling member 30. Through a coupling path 40, the controller output signal applied to the first torquer 18 generates a signal which is superimposed to the controller output signal from the second controller 38 in a summing junction 42 at the input of the second torque motor 22. Angular rate signals $\dot{\rho}_L$ are derived from the movements of the rotary element 10 and are applied, as illustrated by the connections 44 and 46, as feedback signals to the controllers 36 and 38, respectively.

Figure 3:
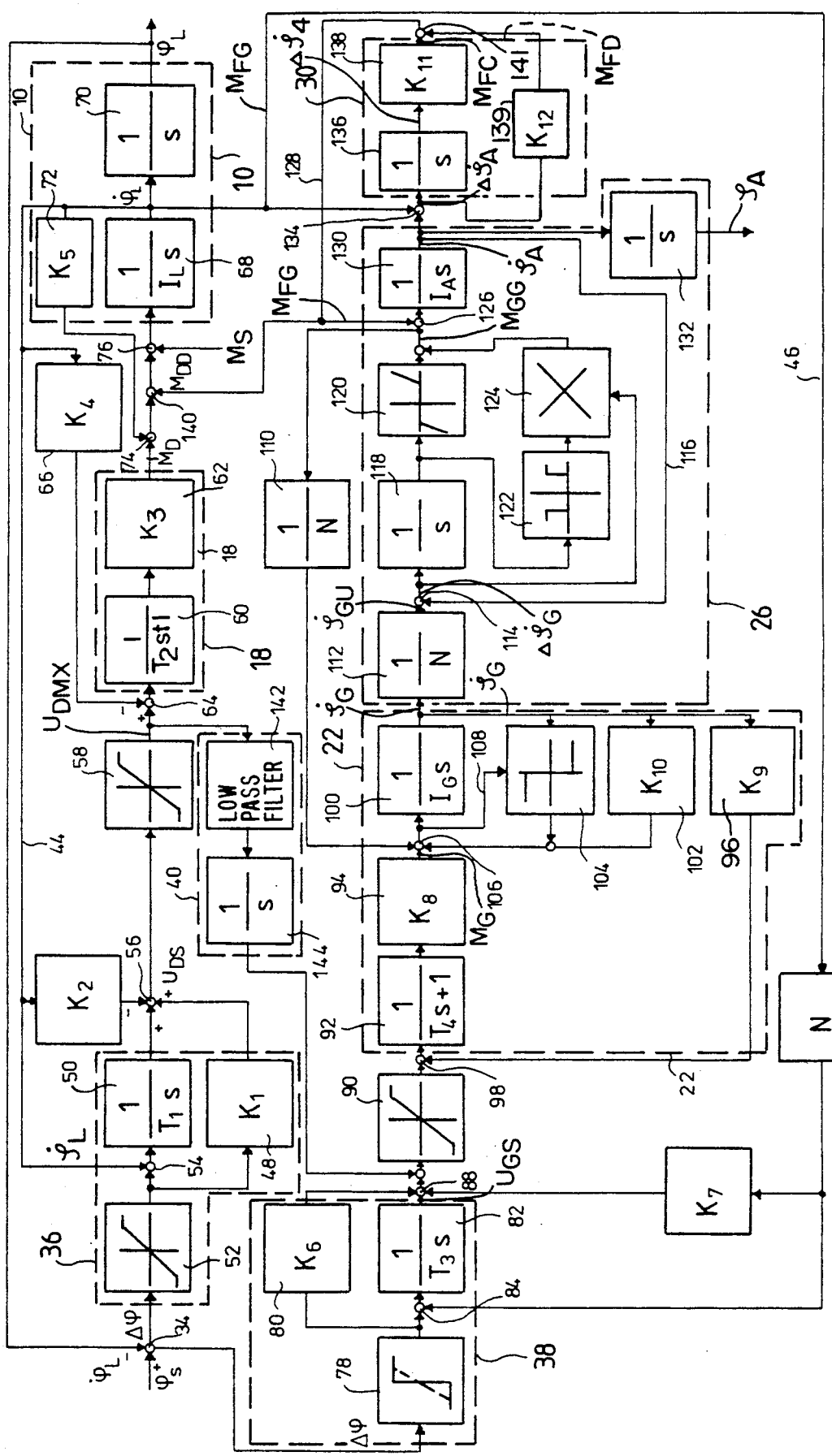
FIG. 3 is a block diagram similar to FIG. 2 and illustrates, in detail, the structure of a model of the actuating drive with the two control loops and the linking of these control loops.

A model of the system is illustrated in greater detail in FIG. 3.

The first controller 36 is a proportional plus floating (PI) controller having a proportional channel illustrated by block 48 with a transfer factor $K_1$ and a floating (I) channel illustrated by block 50 with a transfer function $1/T_1s$. $T_1$ is a time constant and s is the variable of the Laplace transform. A transfer element with limitation 52 is provided at the input of the controller 36. The function of this transfer element 52 is to suppress excessively large signals. A signal representing the angular rate $\dot{\rho}_L$ is applied to the input of the floating (I-) channel through a summing junction 54. The outputs from the floating channel 48 and from the proportional channel 50 are added in a summing junction 56. In addition, a feedback signal proportional to the angular rate multiplied by a transfer factor $K_2$ is superimposed in the summing junction 56. Therefrom the controller provides a controller output signal $U_{DS}$.

Figure 4:
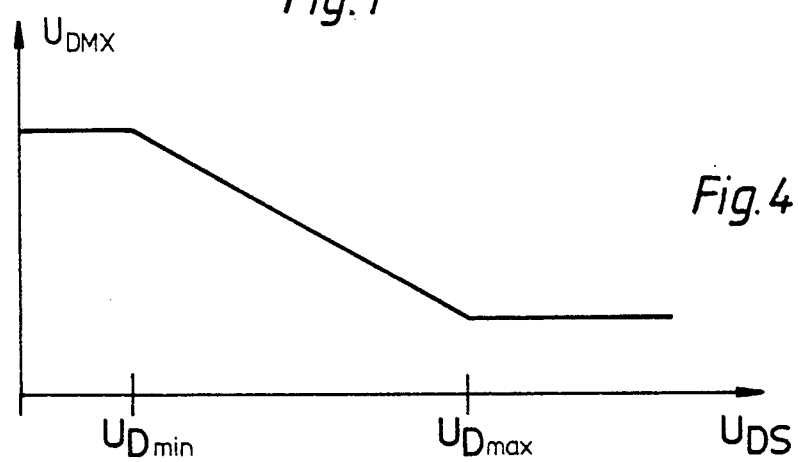
FIG. 4 illustrates, how a limiting value of an adaptive transfer element with limitation in FIG. 3 is dependent on the error signal.

The controller output signal $U_{DS}$ from the first controller 36 is applied to an adaptive transfer element with limitation 58. The adaptive transfer element with limitation 58 limits the controller output signal $U_{DS}$ to a limit value $U_{DMX}$. When the controller output signal is below this limit value, it will be allowed to pass. If it is above this limit value, it will be limited to the limit value $U_{DMX}$. The limit value $U_{DMX}$, in turn, is dependent on the error signal. The larger the error signal is, the smaller is the limit value of the adaptive transfer element with limitation. This is illustrated in FIG. 4. A limited controller output signal $U_{DL}$ appears at the output of the adaptive transfer element with limitation 58.

This limited controller output signal is applied to the first torque motor 18. The first torque motor 18 can be represented by a time function element 60 having a transfer function of the form $1/(T_2s+1)$, and a constant $K_3$. The constant $K_3$ is represented by a block 62. For the representation of the torque motor 18, also the angular rate $\dot{\rho}_{\div L}$ multiplied by a factor $K_4$ has to be taken into account, this multiplied angular rate being superimposed with negative sign to the limited controller output signal in a summing junction 64. The factor $K_4$ is illustrated by block 66. This feedback represents the countervoltage induced by movement of the rotor of the torque motor 18. The torque motor 18 provides a torque $M_D$, which acts directly on the rotary element 10.

In the model, the rotary element can be represented by two integrations: A first integration with a transfer function $1/I_L s$ is represented by block 68 and provides the angular rate $\dot{\rho}_L$ of the rotary element 10. $I_L$ is the moment of inertia of the rotary element 10. A second integration with a transfer function $1/s$, represented by block 70, provides the position $\rho_L$ of the rotary element.

The torque $M_D$ exerted by the torque motor is counteracted by a torque proportional to the angular rate. This latter torque is caused by viscous friction. This is represented by a block 72 with a transfer factor of $K_5$. In the block diagram, the torque caused by viscous friction is "superimposed" with negative sign to the actuating torque $M_D$ in a summing junction 74. Disturbing torques $M_S$ are superimposed in a summing junction 76 at the input of block 68.

The second controller 38 has the same structure as the first controller 36. A transfer element with limitation 78 is provided at the input of the controller and limits excessive error signals. The controller 38 has a proportional channel 80 with a transfer factor $K_6$ and a floating (I-) channel 82 with a transfer function $1/T_3s$. Similar to the first controller 36, the input of the floating channel has applied thereto the angular rate $-\dot{\rho}_L$ multiplied by the step down factor N of the step down system 26, this multiplied angular rate being superimposed to the limited error signal in a summing junction 84. The two channels 80 and 82 are connected to a summing junction 88. In the summing junction 88, the angular rate $\dot{\rho}_L$ multiplied by a transfer factor $K_7$ is superimposed with negative sign as feedback signal. Thus the second controller output signal $U_{GS}$ from the second controller 38 is obtained at the summing junction 88.

This controller output signal $U_{GS}$ is applied to the torque motor 22 through a transfer element with limitation 90. The transfer element with limitation 90 has only the function of limiting excessive controller output signals. Its function does not correspond to that of the adaptive transfer element with limitation 58, as will be explained hereinbelow. In the model, the torque motor 22 can again be represented by a time function element 92 with a transfer function in the form $1/(T_4s+1)$ and a constant transfer factor $K_8$, which is represented by block 94. The output angular rate $\dot{\rho}_G$ of the second torque motor 22 multiplied by a transfer factor $K_9$ is superimposed with negative sign to the controller output signal $U_{GS}$ at the input of the time function element 92. The transfer factor is represented by a block 96. The superimposing is done in summing junction 98. This "feedback" again represents the countervoltage induced upon rotary movement of the torque motor. Block 100 with the transfer function $1/I_G s$ represents the conversion of the torque $M_G$ of the torque motor 22 into an angular rate $\dot{\rho}_G$. $I_G$ is the moment of inertia of the rotor of the torque motor 22. Blocks 102 and 104 represent damping and mechanical friction of the second torque motor 22. These blocks provide torques which, in a summing junction 106, counteract the torque $M_G$ exerted by the torque motor 22. The damping is proportional to the angular rate $\dot{\rho}_G$ with a transfer factor $K_{10}$. The mechanical friction of the torque motor is proportional to the effective resultant torque, as indicated by the connecting line 108, and dependent on the direction of rotation, thus of the sign of the angular rate $\dot{\rho}_G$. This has been symbolized by the function shown in block 104.

A further torque acting on torque motor 22 is the counter-torque, which has to be overcome by the torque motor through the step down system 26. This is the output torque $M_{GG}$ of the step down system, though divided by the step down ratio N. This is illustrated by the path with block 110.

The step down system 26 causes reduction of the angular rate $\dot{\rho}_G$ by a factor N. This is illustrated by block 112. A stepped-down angular rate $\dot{\rho}_{GU}$ results. In order to represent the real characteristics of the step down system, the difference of the angular rate $\dot{\rho}_G$ divided by N of the torque motor 22 and of the actual output angular rate $\dot{\rho}_A$ of the step down system 26 is formed. If these angular rates were equal, for example because the driven shaft of the step down system were driven by some outside means at the same angular rate, there would be no play and no static friction in the step down system. The step down system also would not transmit any torque. Therefore, in the model, the difference is formed of the angular rate $\dot{\rho}_G$ divided by N of the torque motor and the output angular rate $\dot{\rho}_A$ "fed back" through connection line 116. From the difference of the angular rates an angle difference $\Delta\rho_G$ results by integration, represented by block 118 with the transfer function 1/s. This is a torsion of the step down system 26. This torsion results in an output torque $M_{GG}$. As illustrated by block 120, because of the play a certain torsion does not yet result in an output torque. Only after a certain value of the torsion has been reached, this play has been accommodated and an output torque becomes effective. This has been indicated by the function in block 120. Furthermore, the elastic deformation has to be taken into account. This is illustrated by block 122 and multiplying element 124. Block 122 provides, as the function shown therein indicates, a constant "output", when the torsion in one or the other direction exceeds a given value, determined by the play. The torque then exerted is proportional to the difference $\Delta\rho_G$ of the angular rates. The torque $M_{GG}$ is counteracted by the torque $M_{FG}$ occurring at the resilient coupling member 30. This is represented by a summing junction 126, to which the torque from the coupling member is "applied" through connecting line 128. The torque thus obtained acts on the moment of inertia $I_A$ of the intermediate mass of the step down system and, by integration with the transfer function $1/I_A s$ provides the output angular rate $\dot{\rho}_A$. This is represented by block 130.

Integration of the angular rate yields the angle $\rho_A$ at the output of the step down system, as represented by block 132. The resilient coupling member 30 is connected, at one end thereof, with the rotary element to be positioned, and, at its other end, with the output shaft of the step down system. In the model, the difference $\Delta\dot{\rho}_A$ of the angular rates of the element 10 to be positioned and of the output shaft of the step down system 26 is formed in a summing junction 134. Integration in block 136 with the transfer function 1/s yields the difference $\Delta\rho_A$ of the position angles, thus the torsion of the resilient coupling member 30. In accordance with the spring characteristic, which is represented by a block 138 with a constant $K_{11}$, a torque $M_{FC}$ effective at the resilient coupling member is obtained. This torque $M_{FC}$ is superimposed by a torque $M_{FD}$ which is proportional to the rate of the torsion angle with a factor $K_{12}$ (represented by a block 139) and represents the damping of the coupling member 30. Thus there is a resultant torque $M_{FG} = M_{FC} + M_{FD}$, which, in the model, is formed at a summing junction 141.

This torque $M_{FG}$ is superimposed in a summing junction 140 to the torque $M_D$ of the first torque motor 18, corrected by the damping torque. The torsioned resilient coupling member 30 also engages the rotary element to be positioned.

The controller output signal $U_{DS}$ limited by the adaptive transfer element with limitation 58 generates a signal through the coupling path 40 at the input of the second torque motor 22. The coupling path 40 comprises a low pass filter 142 and an integrator 144.

The model described represents the functions of the controllers with the coupling path, of the torque motors, of the step down system and of the resilient coupling member. The arrangement described with reference to this model operates as follows.

With large error signals, the controller output signal of the first controller 36 is heavily limited in accordance with the characteristic, illustrated in FIG. 4, of the adaptive transfer element with limitation 58. Virtually the first controller 36 is disabled. This prevents the first controller, which reacts very quickly due to its larger bandwidth, from building up a large torque with large error signals. Such a torque would be regarded as a disturbing torque by the second controller 38. The second controller would attempt to counteract this presumed disturbing torque. The two controllers would operate in opposition, whereby a strong current would flow in continuous operation in the first torque motor, because of the step down system to which the second torque motor is connected.

Therefore, the positioning movement is, at first, provided by the second controller 38 and the second torque motor 22 with the step down system 26 connected to its output shaft. Only after small error signals have been reached, the first controller 36 with the first torque motor 18, which is directly coupled with the rotary element 10 to be positioned, will become active. The limit values of the adaptive transfer element with limitation 58 increase, and very quickly a torque is exerted by the first torque motor 18. Thereby the first torque motor 18 is able to see to the fine positioning of the rotary element 10. The first torque motor 18 can do this even if the second torque motor 22 comes to a stillstand already with a finite small error signal due to friction or play. Therefore the first torque motor 18 need not work against the second torque motor 22 and the step down system 26. Rather it causes torsion, proportional to the torque, of the resilient coupling member 30.

As long as a controller output signal from controller 36 is applied to the first torque motor 18 through the adaptive transfer element with limitation 58, a signal builds up at the input of the second torque motor 22 through the coupling path 40 with the integrator 144. This signal eventually causes follow-up movement of the second torque motor 22, such that the rotary element 10 to be positioned is rotated into the position determined by the desired value signal. This coupling path prevents the two torque motors 18 and 22 from working in opposition. The coupling path causes the operating point of the first torque motor 18 to be placed on the desired value by "trimming" by means of the second torque motor 22.

The low pass filter 142 is to suppress the influence of higher frequency disturbances.

The fact that the coupling path branches off behind the adaptive transfer element with limitation 58, ensures that the second torque motor 22 virtually is not influenced by the controller output signal of the first controller, as long as the error signal is still large, i.e. during the coarse positioning.

It would be undesirable, if large signals were generated at the input of the adaptive transfer element with limitation 58, due to the fact that during a positioning procedure a large error signal is applied, which is integrated by the floating (I-) channel 50 of the first controller 36. Therefore the floating (I-) channel 50 of the first controller 36 is switched off, as long as the error signal exceeds a given value, i.e., for example, as long as the limit value of the adaptive transfer element with limitation 58 is limited to the lowermost value of the characteristic of FIG. 4.

I claim:

1. An actuating drive for positioning a rotary element to a position determined by a desired value signal, comprising the combination of
   (a) an angle pick-off, which provides an actual value signal indicative of the position of the rotary element,
   (b) a first controller, to which a difference of said actual value signal and said desired value signal is applied as error signal and which provides a first controller output signal,
   (c) a first torque motor,
     a rotor of which is directly connected with said rotary element, and
     to which said first controller output signal from said first controller is applied,
   (d) a second controller, to which the difference of said actual value signal and said desired value signal is applied as error signal and which provides a second controller output signal,
   (e) a second torque motor, to which the second controller output signal from said second controller is applied,
   (f) a step down system, an input member of which is connected to said second torque motor and an output member of which is in driving connection with said rotary element, and
   (g) means for linking control loops of said first and second controllers such that said second torque motor through said step down system provides for coarse positioning of said rotary element to be positioned, and said first torque motor provides for fine positioning after such coarse positioning.

2. An actuating drive as claimed in claim 1, wherein a resilient coupling member is connected, at one end thereof, with said step down system and, at its other end, with said rotary element to permit said first torque motor to effect fine positioning of said rotary element even with the second torque motor coming to a stilstand already with a finite small error signal.

3. An actuating drive as claimed in claim 1, wherein said first controller comprises an adaptive transfer element with limitation controlled by said error signal of said first controller, said transfer element limiting said first controller output signal to a maximum value, said maximum value being reduced with increasing error signal down to a lowermost value.

4. An actuating drive as claimed in claim 1, wherein the controller output signal from said first controller, through a coupling path, influences the input signal of said second torque motor to cause said second torque motor to build up a torque until said first controller output signal becomes zero.

5. An actuating drive as claimed in claim 4, wherein said coupling path comprises an integrator.

6. An actuating drive as claimed in claim 5, wherein said coupling path further comprises a low pass filter.

7. An actuating drive as claimed in claim 3, wherein
   (a) the controller output signal from said first controller, through a coupling path, influences the input signal of said second torque motor to cause said second torque motor to build up a torque until said first controller output signal becomes zero, and
   (b) said coupling path branches off behind said adaptive transfer element with limitation.

8. An actuating drive as claimed in claim 1, wherein said first and second controllers are proportional-plus-floating controllers.

9. An actuating drive as claimed in claim 8, wherein said first controller has a substantially larger bandwidth than said second controller.

10. An actuating drive as claimed in claim 8, wherein the floating channel of said first controller is switched off, as long as the error signal exceeds a predetermined value.

11. An actuating drive for positioning a rotary element to a position determined by a desired value signal, comprising the combination of
    (a) an angle pick-off, which provides an actual value signal indicative of the position of the rotary element,
    (b) a first controller, to which a difference of said actual value signal and said desired value signal is applied as error signal and which provides a first controller output signal, wherein said first controller comprises an adaptive transfer element with limitation controlled by said error signal of said first controller, said transfer element limiting said first controller output signal to a maximum value, said maximum value being reduced with increasing error signal down to a lowermost value,
    (c) a first torque motor,
      a rotor of which is directly connected with said rotary element, and
      to which said first controller output signal from said first controller is applied,
    (d) a second controller, to which the difference of said actual value signal and said desired value signal is applied as error signal and which provides a second controller output signal,
    (e) a second torque motor, to which the second controller output signal from said second controller is applied,
    (f) a step down system, an input member of which is connected to said second torque motor and an output member of which is in driving connection with said rotary element, and
    (g) means for linking control loops of said first and second controllers such that said second torque motor through said step down system provides for coarse positioning of said rotary element to be positioned, and said first torque motor provides for fine positioning after such coarse positioning.

12. An actuating drive as claimed in claim 11, wherein the controller output signal from said first controller, through a coupling path, influences the input signal of said second torque motor to cause said second torque motor to build up a torque until said first controller output signal becomes zero.

13. An actuating drive as claimed in claim 12, wherein said coupling path comprises an integrator.

14. An actuating drive as claimed in claim 13, wherein said coupling path further comprises a low pass filter.

15. An actuating drive as claimed in claim 11, wherein
(a) the controller output signal from said first controller, through a coupling path, influences the input signal of said second torque motor to cause said second torque motor to build up a torque until said first controller output signal becomes zero, and
(b) said coupling path branches off behind said adaptive transfer element with limitation.

* * * * *